Nov. 7, 1933.　　　A. E. MÜLLER　　　1,933,870
PRIME MOVER ELECTRIC DRIVE SYSTEM
Filed March 11, 1932
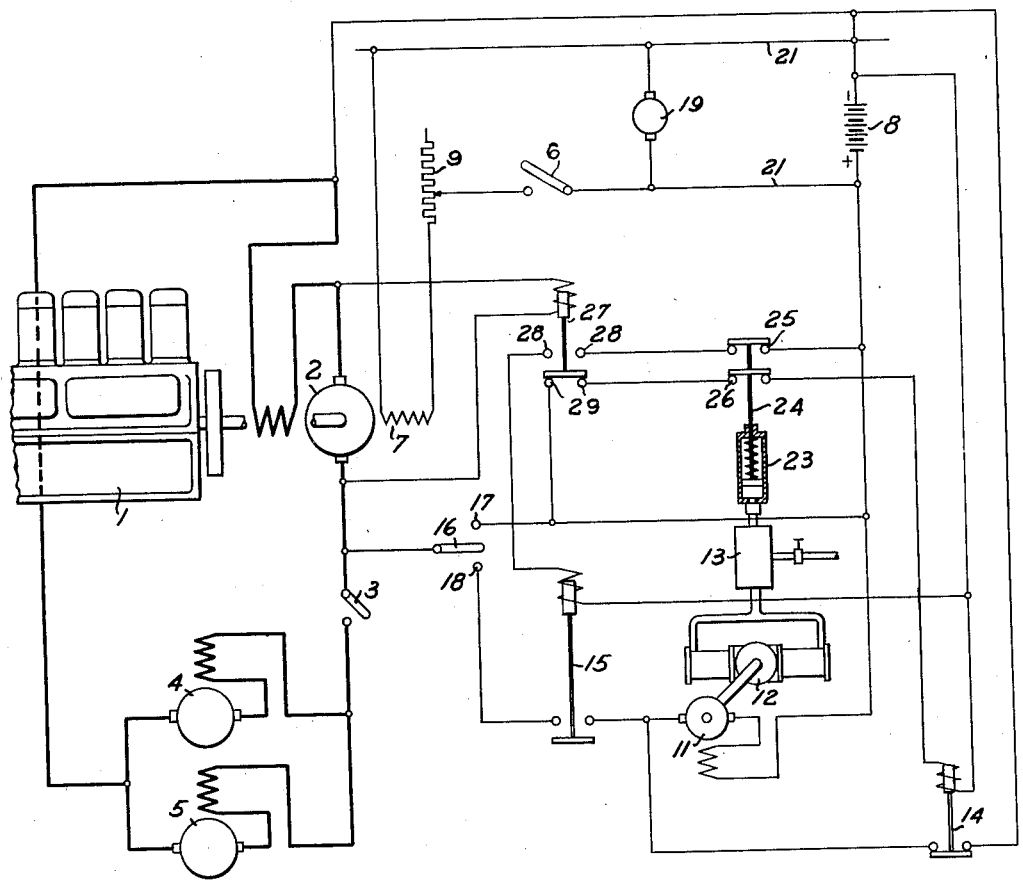
Inventor
A. E. Müller
by
Attorney Patented Nov. 7, 1933

1,933,870

UNITED STATES PATENT OFFICE 1,933,870

PRIME MOVER ELECTRIC DRIVE SYSTEM

Alfred Ernst Müller, Wettingen, Switzerland, assignor to Aktiengesellschaft Brown Boveri & Cie, Baden, Switzerland, a joint stock company of Switzerland Application March 11, 1932, Serial No. 598,148, and in Germany March 12, 1931

7 Claims. (Cl. 290—16)

This invention relates to improvements in prime mover-electric drive systems for vehicles and more particularly to a system in which motors operating auxiliary devices on the vehicle are supplied with current from the generator supplying the traction motor driving the vehicle.

When vehicles such as locomotives are provided with a prime mover such as a Diesel engine driving an electric current generator which supplies current to motors driving the traction wheels of the vehicle, an auxiliary generator is usually provided to supply current to charge batteries used for starting the engine or for providing illumination and to operate auxiliary motors such as motors driving air compressors or motors driving pumps for the circulation of cooling water. Such auxiliary generator is generally adjusted to produce a constant voltage at its terminals regardless of the speed of the Diesel engine by which the generator is usually driven. The above arrangement is well adapted for large locomotives which require the operation of a large number of devices other than the traction motors.

For vehicles of only about 100 to 150 H. P. for which the system required for the auxiliary drives is relatively simple, the use of an auxiliary generator such as indicated above makes the electrical systems of the vehicle undesirably complicated. The direct connection of the motors for the auxiliary devices with the main generator is, however, also undesirable because the widely varying terminal voltage of such generators produces undesirable operating characteristics of the auxiliary motors.

It is, therefore, among the objects of the present invention to provide a prime mover-electric drive system for vehicles in which the motors driving the auxiliary devices on the vehicle are supplied with electric current from the same generator which supplies current to the traction motors of the vehicle.

Another object of the invention is to provide a prime mover-electric drive system in which one of the motors driving an auxiliary device on the vehicle is connected in series with a battery, the motor being such as to require a constant current regardless of the voltage supplied thereto, so that the voltage supplied to the battery and to other auxiliary motors connected therewith remains substantially constant.

Another object of the invention is to provide a prime mover-electric drive for vehicles in which a main generator supplies current to the traction motors driving the vehicle and also supplies current for motors operating auxiliary devices and for charging a battery, the supply of current to the auxiliary motors and the battery being controlled by a control system operated in response to the output voltage of the generator.

Objects and advantages other than those above set forth will be apparent from the following description when read in connection with the accompanying drawing which schematically represents a prime mover-electric drive system for a locomotive in which one of the motors driving an auxiliary device and a battery are connected directly with the main generator supplying the traction motors of the vehicle and control the voltage supplied to the motors driving other auxiliary devices on the vehicle.

Referring more particularly to the drawing by characters of reference, the reference numeral 1 designates a prime mover such as a Diesel engine which is directly connected with a generator 2 supplying electric current through switch 3 to a plurality of motors 4 and 5. The generator 2 is excited by a winding 7 energized from a battery 8 through contacts of a suitable switch 6 and a variable resistance 9 by which the degree of excitation of the generator 2 may be controlled.

A motor 11, driving an auxiliary device such as a compressor 12 which discharges into an air receiver or reservoir 13, is connected with the battery 8 through contacts controlled by a relay 14 and may be connected in series with the generator 2 and the battery 8 through the contacts of a relay 15 and through a switch having a movable contact 16 and alternate fixed contacts 17 and 18. Motors driving other auxiliary devices such as the motor 19 are arranged to be connected across with the battery 8 by means of an auxiliary line 21.

The pressure of the air in the receiver 13 is controlled by a pressure regulator 23 which operates a contactor 24 arranged to bridge contacts 25 and 26 by which relays 14 and 15 are connected with the terminals of the battery 8 as long as the pressure in the receiver 13 remains below a predetermined volume. A relay 27 is connected across the terminals of the generator 2 and is arranged to bridge contacts 28 and 29, also serially included in the connections of relays 14 and 15 with the battery 8, dependent on the voltage impressed on the coil thereof from the generator 2.

In operation, when the engine 1 is to be started from standstill and the system is deenergized, switches 3 and 16 being in the open positions, switch contact 16 is moved into engagement with the contact 17 thereof. The battery is thus connected in series with generator 2 which now acts as a series motor to start the engine 1. As soon as the engine 1 is started, switch contact 16 is reversed from its starting position above described into engagement with the contact 18 thereof, and switches 3 and 6 close so that the generator 2 operates as a differential compound generator and delivers current to the traction motors 4 and 5. The output voltage of the generator 2 may be regulated by varying speed of the engine 1 the amount of the resistance 9 in the circuit of the excitation winding 7 or by varying both the speed of the engine 1 and the amount of the resistance 9 in the circuit of the excitation windings 7. Assuming that the engine 1 is operating at low speed, that the generator output voltage is below the voltage of the battery 8 and that the pressure in the air receiver 13 is not sufficient to lift the contactor 24 out of bridging engagement with the pair of contacts 25 and 26, the circuit to relay 15 from battery 8 will be open, the voltage impressed on the coil of relay 27 not being sufficient to cause lifting of the armature thereof, and the circuit of the battery to the relay 14 will be closed, thus the circuit for supply of current from the generator 2 to the motor 11 and the battery 8 will be completed and the motor 11 will be supplied with current from battery 8 through the contacts of relay 14.

When the speed of engine 1 increases and hence the output voltage of generator 2 rises above the voltage of battery 8, relay 27 is actuated lifting the armature thereof to close contacts 28 and open contacts 29. The opening of contacts 29 interrupts circuit for the relay 14 from the positive terminal of battery 8 through the contacts 29, 26, through the coil of relay 14 and back to the negative terminal of battery 8. The armature of relay 14 then drops and opens the circuit through the contacts thereof for supply of current to the motor 11 from the battery 8. The opening of contacts 29 as described completes circuit for the relay 15 from the positive terminal of battery 8 through contacts 25, 28, through the coil of relay 15 and back to the negative terminal of the battery 8. Relay 15, therefore, lifts its armature and connects motor 11 in series with the battery 8 across the output terminals of the generator 2. Due, therefore, to the fact that the motor 11 is a series wound motor and receiving a constant current, its torque is practically independent of the voltage supplied thereto and is determined merely by the current flowing therethrough; and its speed, at constant current, is proportional to its counter E. M. F. As compressor 12 requires substantially the same torque for each reciprocation thereof, independently of the speed, motor 11 will exert a constant torque and a definite current supplied thereto for any predetermined volume of air discharged per stroke of the compressor. Due to the series connection of the motor 11 and the battery 8, and the above mentioned characteristics of the compressor 12, the speed and the counter E. M. F. of the motor 11 will change upon change of the output voltage of the generator 2 in such manner that a substantially constant charging current, sufficient for maintaining the battery 8 in substantially charged condition, is supplied to the battery 8 from generator 2 regardless of the limits between which the terminal voltage thereof may fluctuate. If the charge of the battery 8 gradually decreases, the battery may be connected directly with the generator 2 through the switch contacts 16, 17 and the full generator voltage may be supplied to the battery, which may be adjusted in value by varying the effective amount of the adjustable resistance 9.

If the air drawn from the receiver is less than the amount discharged thereto from the compressor 12, so that the air pressure rises above a predetermined value, the pressure regulator 23 operates to open contacts 25 and 26. The circuit from the positive terminal of battery 8 over the contacts 24 and 25, through the coils of the relays 14 and 15 to the negative terminal of battery 8 are thus interrupted and the armatures of relays 14 and 15 drop, which interrupts the circuit for the flow of current from the generator to or from battery 8 to the motor 11 and the compressor 12 stops. The sizes of the various portions of the auxiliary system using air from the receiver 13 are, however, so chosen that excessive pressures are seldom produced in the air receiver.

Assuming that the pressure regulator 23 has not operated, and hence that the contactor 24 is still in position to bridge contacts 25 and 26, as soon as the output voltage of generator 2 drops below the voltage of battery 8, the energization of coil of relay 27 is decreased to such an extent that the armature thereof drops to open contacts 28 and to close contacts 29. Opening of contacts 28 interrupts the circuit from the positive terminal of battery 8 over the contacts 25 and 28 through the coil of the relay 15 and back through the negative terminal of battery 8. The armature of relay 15, therefore, drops and interrupts the circuit by which the motor 11 and the battery 8 were supplied with current from the generator 2. As soon as the output voltage of the generator again rises above the battery voltage, the relay 27 reestablishes connection thereof with the generator.

When the engine 1 is stopped, the armatures of relays 27 and 15 drop and the coil of the relay 14 is connected with battery 8 over contacts 29 and 26 and the armature of the relay, therefore, lifts to establish circuit for the supply of current from the battery 8 to the motor 11. Switch 3 must then be opened and switch contact 16 must be reversed from connection with contact 18 thereof to connection with contact 17 thereof to restart the engine as above described.

It will be understood that the motor 11 need not operate a compressor but may be used to operate a fan or any other auxiliary device on the vehicle, the only requirement being that the motor then be a constant current machine of any well known type.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a prime mover-electric drive for vehicles, a prime mover, a generator driven by said prime mover, one or more traction motors supplied with electric current from said generator, a battery to supply electric current to start said prime mover, a plurality of auxiliary devices arranged on the vehicle, auxiliary motors for operating said auxiliary devices, one of said motors being arranged for connection in series with said generator and said battery, the others of said motors being connected in parallel with said battery, and means for controlling the connections of said battery and the said series connected motor with said generator in response to a predetermined output voltage of said generator.

2. In a prime mover-electric drive for vehicles, a prime mover, a generator driven by said prime mover, a traction motor supplied with electric current from said generator, a battery to supply electric current to start said prime mover, an auxiliary device arranged on the vehicle, an auxiliary motor driving said auxiliary device, said battery and said motor being arranged for connection in series with said generator, means operated responsive to operation of said auxiliary device for controlling said connection of said battery and auxiliary motor with said generator, and means operated in response to a predetermined output voltage of said generator and cooperating with the first said means to control the connection of said battery and said auxiliary motor with said generator.

3. In combination with an electric current generator, a storage battery, a fluid pressure producing unit, and an electric motor for operating said unit, of means operable to connect said battery with said motor to operate the latter, means operable to connect said generator with said battery in series with said motor to operate the latter and to charge said battery, means actuated responsive to and in dependence upon the output voltage of said generator for controlling the alternate operative connections of said battery with the first and second said means to operate the same, and means associated with and operated responsive to the fluid pressure created by said unit above a predetermined value for controlling said connections of said battery with the first and second said means.

4. In combination with a prime mover, an electric current generator driven by said prime mover, and a storage battery, of means for connecting said battery with said generator to operate the latter as a motor to start operation of said prime mover, of a fluid pressure producing unit, an electric motor for operating said unit, means operable to connect said battery with said motor for operating the latter, means for connecting said generator with said battery in series with said motor to operate the latter and to charge said battery, means actuated responsive to and in dependence upon the output voltage of said generator for controlling the alternate operative connections of said battery with the first and second said means to cause the same to be alternately operated, and means associated with and operable responsive to fluid pressure created by said unit for preventing said operative connections of the first and second said means.

5. In combination with a prime mover, an electric current generator driven by said prime mover and having opposing series and separately excited field windings, and a storage battery, of means for connecting said battery with said generator to operate the latter as a series motor to start operation of said prime mover, a fluid pressure producing unit requiring a substantially constant operating torque, a constant current series motor for producing said torque, a first relay for connecting said battery with said motor to operate the latter, a second relay for connecting said generator with said battery in series with said motor to operate the latter and to charge said battery at a substantially constant rate, a third relay actuated responsive to and in dependence upon the output voltage of said generator above a predetermined value for controlling the alternate operative connection of the said first and second relays to thereby cause the same to be alternately operated, switch means operable responsive to fluid pressure created by said unit cooperating with the said third relay to permit and prevent the said connections of said battery with the said first and second relays.

6. In combination with an electric current generator, a storage battery, a fluid pressure producing unit requiring a substantially constant operating torque, a constant current electric motor for producing said torque, of means operable to connect said battery with said motor to operate the latter, means operable to connect said generator with said battery in series with said motor to operate the latter and to charge said battery, means actuated responsive to and in dependence upon the output voltage of said generator for controlling the alternate operative connection of said battery with the first and second said means to operate the same, and means associated with and operable responsive to the fluid pressure created by said unit above a predetermined value for controlling said connections of said battery with the first and second said means.

7. In a prime mover electric drive for vehicles, a prime mover, an electric current generator driven by said prime mover and having opposing series and separately excited field windings, one or more traction motors supplied with operating current from said generator, a storage battery, means for connecting said battery with said generator to operate the latter as a series motor to start operation of said prime mover, a fluid pressure producing unit requiring a substantially constant operating torque, an auxiliary constant current motor for producing said torque, means for connecting said battery with said auxiliary motor for operating the latter, means for connecting said generator with said battery in series with said auxiliary motor to operate the latter and to charge said battery at a substantially constant rate, means actuated responsive to and in dependence upon the output voltage of said generator above a predetermined value for controlling the alternate operative connection of said battery with the first and second said means to thereby cause the same to be alternately operated, means associated with and operable responsive to fluid pressures created by said unit cooperating with the third said means to permit and prevent the said connections of said battery with the first and second said means, and means for varying the degree of excitation of said separately excited field winding whereby the output voltage of said generator is caused to vary substantially inversely proportionately with the current thereof to thereby effect substantially constant load thereon over large speed variations of said prime mover.

ALFRED ERNST MÜLLER.